United States Patent [19]

Maselli et al.

[11] 3,883,444

[45] May 13, 1975

[54] AUTO EXHAUST CATALYST

[75] Inventors: James M. Maselli; Gwan Kim, both of Columbia, Md.

[73] Assignee: W. R. Grace & Co., New York, N.Y.

[22] Filed: Apr. 11, 1973

[21] Appl. No.: 350,212

Related U.S. Application Data

[63] Continuation-in-part of Ser. No. 164,466, July 20, 1971, abandoned.

[30] Foreign Application Priority Data

June 20, 1972 United Kingdom............... 28868/72

[52] U.S. Cl.......... 252/455 R; 252/462; 252/466 B; 252/472; 423/213.5
[51] Int. Cl...................... B01j 11/08; B01j/11/22
[58] Field of Search............ 252/466 B, 472, 455 R; 423/213.2, 213.5, 213.7

[56] References Cited
UNITED STATES PATENTS

| | | | |
|---|---|---|---|
| 2,071,119 | 2/1937 | Harger | 423/213.5 |
| 3,397,154 | 8/1968 | Talsma | 423/213.2 |
| 3,513,109 | 5/1970 | Stiles | 252/472 |
| 3,755,534 | 8/1973 | Graham | 423/213.7 |
| 3,767,764 | 10/1973 | Dolbear | 423/213.7 |

*Primary Examiner*—Winston A. Douglas
*Assistant Examiner*—W. J. Shine
*Attorney, Agent, or Firm*—Joseph P. Nigon

[57] ABSTRACT

This invention is a catalytic system for internal combustion engines. More specifically, this invention is a catalytic system which comprises cobalt oxide and optionally additional oxides of nickel, promoted with palladium and supported on a suitable support material as a catalyst for nitrogen oxide conversion.

7 Claims, No Drawings

AUTO EXHAUST CATALYST

This application is a continuation-in-part of application Ser. No. 164,466, filed July 20, 1971, now abandoned.

BACKGROUND OF THE INVENTION

Prior Art

The problem of air pollution is not a new one. However, the problem has become more and more serious in many cities in recent years. Much of the pollution is a result of pollutants which are derived from unburned or partially burned hydrocarbons in the exhaust of internal combustion engines.

The exhaust gases of the internal combustion engine also contains oxides of nitrogen. In the presence of sunlight, photolysis of the oxides of nitrogen leads to the formation of measurable quantities of ozone. The ozone, in turn, reacts with various organic pollutants to form compounds which can cause the many undesirable manifestations of smog, such as eye irritation, visibility reduction, and plant damage.

If there is not a rapid dispersion of pollutants due to meterorlogical conditions, a smog condition results. Another pollutant which is of much concern is carbon monoxide which is undesirable because of its toxic nature. It, too, is derived mainly from exhaust emissions.

Almost since the advent of the automobile attempts have been made to solve the problem by rendering harmless and unobjectionable the noxious fumes which are the by-products of internal combustion engines. Various devices and filters using elementary catalytic materials, and from the 1920's on, various modifications of filters and mufflers, have been designed in an attempt to solve this problem. To date, none have met the success complete enough for practical application.

It does not seem feasible to install catalytic systems which must be periodically removed and rejuvenated because of the cost of such a system and such treatment.

Several investigators have realized that the only practical way to treat exhaust fumes to reduce hydrocarbon and carbon monoxide pollution is to oxidize the hydrocarbons to carbon dioxide and water and to oxidize the carbon monoxide to carbon dioxide. It is also known that to remove the nitrogen oxides ($NO_x$) which are present in the exhaust gases, it is preferable to reduce the various oxides to $N_2$. Thus there is the problem of finding a catalyst capable of reducing the nitrogen oxides to $N_2$.

A wide selection of oxidation catalysts have been produced in the past, varying both in chemical composition and physcial sturcture. With respect to chemical composition, the ability of a wide variety of metals and metal oxides, either alone or in combination, to catalyze the complete oxidation of hydrocarbons and carbon monoxide have been noted.

To be sufficiently efficient for the removal of hydrocarbons and carbon monoxide from auto exhaust gases and to meet the standards of maximum emissions currently under consideration in the legislatures of the various States, a catalyst for treating exhaust gases must become efficient within a very few minutes after engine start-up and must maintain its activity throughout the various modes of engine operation. A catalytic converter must maintain its activity for a period of not less than one year and preferably for two years or 20,000 miles of engine operation.

The problem of excessively high temperatures which are obtained when concentrations of pollutants are being oxidized must also be solved in this system. It is not unusual for catalytic temperatures to reach 1800°F or higher. A normal catalytic system cannot withstand prolonged exposure to these temperatures without undergoing a detrimental thermochemical change in the catalyst.

The problem of conversion of carbon monoxide, nitrogen oxides, and hydrocarbons at the low temperatures obtained in a catalytic muffler system at the start-up period of engine operation is also particularly troublesome. A catalyst must be active enough initially to be acceptable for use in an auto exhaust catalyst system. It is not sufficient that a catalyst will have a good activity after the engine is warmed up and the catalyst bed is at a temperature high enough to cause exhaust vapors passing through the bed to be oxidized to carbon dioxide and water or reduced to $N_2$.

The catalytic systems which have been devised to give satisfactory results for carbon monoxide and hydrocarbon conversion frequently suffer from relatively poor conversion of nitrogen oxides, and vice versa. Since the ideal catalytic system gives a good conversion of each of the exhaust gas components, this problem is of prime importance.

Objects of the Invention

It is therefore an object of this invention to produce a catalyst which is capable of reducing nitrogen oxides. It is also an object of this invention to reduce pollution from automotive exhaust gases. It is further an object of this invention to prepare a cobalt oxide catalyst which is characterized by excellent reducing properties. It is more specifically an object of this invention to prepare a cobalt oxide catalyst which also contains amounts of nickel oxides, promoted with palladium, and is supported on a suitable support, e.g., mullite or spinel.

Further objects of this invention will be apparent to those skilled in the art as the description of this invention proceeds.

BRIEF SUMMARY OF THE INVENTION

This invention is a cobalt oxide catalyst promoted with palladium and optionally containing an oxide of nickel, and being supported on a suitable support material. These support materials are spinel (magnesium aluminate) and mullite, each preferably having a surface area of 20 to 200 $m^2/gm$.

Broadly speaking, the process of preparing the catalyst of this invention consists of impregnating the support material with a solution containing soluble cobalt and palladium salts and optionally other soluble salts of nickel.

After impregnation the catalyst is dried for a short period of time at about 120°–260°F. Reimpregnation may be required to give the desired metal level and if necessary the catalyst is redried at a temperature of 120°–260°F. for 2–48 hours. The final step in the preparation of the catalyst is calcination from 1 to 6 hours at 1000°–1400°F.

DETAILED DESCRIPTION OF THE INVENTION

The first step in the preparation of the catalyst of this invention is the selection of a suitable support. The support must have good physical properties and the proper shape and size to avoid the problem of excessive attrition or shrinkage.

Preferably the support is spinel which has a surface area of 20 to 200 m$^2$/g., and more preferably 40 to 140 m$^2$/gm. Typically the spinel is prepared by impregnating gamma or other transitional alumina with the desired amount of magnesium nitrate solution followed by drying, forming into the desired shape and subsequent calcination to 1400°–1800°F. The reaction between the alumina and magnesium nitrate will typically result in a spinel containing 20 to 100 mole percent MgAl$_2$O$_4$ and 80 to 0 mole percent (the remainder) Al$_2$O$_3$ after calcination.

After the support is prepared it is treated with a solution containing soluble cobalt, palladium and optionally soluble salts of nickel so as to impregnate the support to obtain a final catalyst having 4 to 20 weight percent cobalt oxide, 0.005–0.1 weight percent palladium and 0.1–15 preferably 2–12 weight percent of nickel oxide, with the remainder of the catalyst being support material. As spinel is the preferred support material it is generally used throughout the specification and claims. However, as pointed out previously, mullite is also a satisfactory support.

It is to be understood also that the catalysts and catalytic components of this invention are not limited to the conventional spherical ball or particulate form which is predominantly used today. Rather, the catalytic components can be impregnated onto, or within, a monolithic support.

When a monolith is the preferred structure, impregnation can be completed before the support material substrate oxide or oxides is shaped, or following shaping. If impregnation is prior to shaping it can be done as described heretofore. If impregnation takes place following shaping the entire structure is immersed in the impregnating solution or alternatively sprayed with the same. A particularly useful method of preparing a monolithic structure is that wherein a polyolefin, plasticizer, and filler (support material) are admixed, shaped, and the plasticizer extracted, the polyolefin burned-off, and the support material sintered. Stabilized alpha alumina is a useful component of an internal combustion engine exhaust catalyst. A monolith can be coated with stabilized alumina by immersing the entire monolith into a homogeneous slurry comprising alumina and 0.1–10 percent by weight rare earth metal oxide. The monolith is dipped into the slurry, excess slurry is shaken off and the monolith is sprayed with an air hose to remove excess slurry within the monolith. The whole is dried at about 150°–200°F. for one-half hour, heated for 1 hour at 300°F., and then at least 1 hour more to convert the trihydrate to gamma alumina at a temperature of about 1050°F. This procedure provides a monolith containing 10–20 percent by weight stabilized gamma alumina, said gamma alumina impregnated with 0.1–10 percent by weight, based on the weight of the gamma alumina of a rare earth metal oxide. The coated monolith is then impregnated with 4–20 weight percent cobalt oxide, 0.1–15 weight percent of nickel oxide, and 0.005–0.1 weight percent palladium, said weight percentages being based on the total weight of the monolith, as described herein.

Of course, more conventional methods of shaping the catalyst into monolithic structures or spheres can also be used.

The preferred method of preparing the catalyst of this invention is to dissolve the desired amount of each of the metal salts in water and then admix the salt solution and spinel. The water is then evaporated and the impregnated spinel dried. The amount of aqueous impregnation solution used in this stage of preparation is not critical. Suitable impregnation can generally be made by using about 20–120 ml. of impregnating soltuion per 100 grams of support material. The impregnating solution should contain sufficient cobalt, palladium, and nickel to deposit 4–12 weight percent CoO, 0.01 to 0.06 weight percent Pd, and 2–12 weight percent NiO, on the spinel support.

After the impregnation step is complete, the resulting material is dried in the presence of steam, air or mixtures of air and steam at a temperature of about 120°–260°F.

After the catalyst is dried in this manner, it is reimpregnated if desired, to adjust the metal oxide content. The catalyst is then redried at 120°–260°F. for a period of 2 to 48 hours and calcined for 1 to 6 hours at 1000°–1400°F.

In addition to spinel a particularly suitable support base is mullite having a surface area of 20–200 m$^2$/g.

This invention is further illustrated by the following specific but non-limiting examples.

EXAMPLE 1

Gamma alumina balls commercially available from Kaiser Aluminum Co. (50.62 gms. dry wt.) were impregnated with an aqueous solution containing 41.90 grams of Mg(NO$_3$)$_2$ 6 H$_2$O, dried at 230°F. and calcined at 1800°F. for 3 hours. The resulting support showed only a spinel x-ray pattern and had a nominal composition (weight percent) of 11.5% MgO and 88.5% Al$_2$O$_3$. The balls had the following physical properties: 120 m$^2$/gm. surface area and 0.59 gm./cc bulk density.

A catalyst with the following composition was obtained by impregnating 28.52 grams of the above prepared spinel first with a solution containing cobalt and nickel nitrates (15.98 grams of cobalt nitrate and 11.89 grams of nickel nitrate dissolved in 24 mls. water), and then with a solution of palladium tetramine nitrate containing 0.002 g. of palladium per ml. of solution followed by 230°F. drying and calcination at 1400°F. for three hours. The resulting catalyst labeled "Catalyst 1," had a surface area of 80 m$^2$/gm and the following weight percent composition:

| | |
|---|---|
| CoO | 11.42 |
| NiO | 8.56 |
| Pd | 0.02 |
| Spinel | 80.0 |

EXAMPLE 2

A mullite catalyst support (80 g.) with a composition 3 Al$_2$O$_3$.2 SiO$_2$ having a surface area of 30 m$^2$/g., and a pore volume of 0.3 cc/g and sized to about 3 × 3 mm pills was impregnated with 30 ml. of solution containing 28.9 grams of cobalt nitrate and 7.34 grams of chromic acid anhydride (CrO$_3$). This step was followed by another impregnation with a solution of palladium tetramine dinitrate containing 0.002 g. of palladium per ml. of solution. The material was dried at 230°F and calcined at 1400°F for 3 hours. The resulting catalyst, labeled "Catalyst 3," had a surface area of 24 m²/g and the following weight percent composition:

| | |
|---|---|
| CoO | 8.00 |
| $Cr_2O_3$ | 6.00 |
| Pd | 0.02 |
| Mullite | 85.98 |

EXAMPLE 3

Catalysts 1 and 3 were evaluated as to their ability to effect conversion of carbon monoxide, hydrocarbons and nitrogen oxides by determining the percent conversion of a mixture containing 1.0 percent carbon monoxide (CO), 1000 ppm nitric oxide (NO), 250 ppm (as carbon) hydrocarbons ($C_3H_6$), 0.5 percent oxygen ($O_2$), 10.0 percent water ($H_2O$) 10.0 percent $CO_2$ and the remainder being nitrogen ($N_2$). The gases were passed through the catalyst maintained at predetermined temperatures ranging from 350° to 1432°F. at a gaseous hourly space velocity of 14,000 for catalysts 1 and 50,000 for catalyst 3. The results for "Catalyst 1" are shown in Table I, and "Catalyst 3" in Table II.

TABLE 1

| | Catalytic Activity for "Catalyst 1" | | | |
|---|---|---|---|---|
| Hours on Stream | Average Bed Temperature °F. | Conversion (mole %) | | |
| | | CO | HC | NO |
| 0.2 | 934 | 100 | 100 | 100 |
| 0.9 | 807 | 100 | 100 | 100 |
| 1.3 | 679 | 98.2 | 98.6 | 88.4 |
| 19.4 | 813 | 99.1 | 100 | 99.0 |
| 20.4 | 687 | 100 | 98.9 | 93.9 |
| 23.6 | 1432 | 97.8 | 100 | 99.8 |
| 25.0 | 911 | 100 | 100 | 100 |
| 25.5 | 805 | 100 | 100 | 99.5 |
| 26.1 | 681 | 92.9 | 97.8 | 87.8 |

As the Examples show, even after extended use of the catalysts exhibited effectiveness in conversion on nitrogen oxides.

Table II

| Catalytic Activity of "Catalyst 3" | | | |
|---|---|---|---|
| Average Bed Temperature (°F.) | Conversion (mole %) | | |
| | CO | HC | NO |
| 521 | 12.3 | 8.4 | 3.6 |
| 743 | 56.7 | 64.8 | 57.0 |
| 951 | 66.2 | 83.0 | 62.0 |

EXAMPLE 4

Example 3 was repeated except that the chromic acid anhydride was replaced by 21.72 grams of nickel nitrate and the palladium level was held constant. The resulting catalyst, labeled "Catalyst 5" had a surface area of 26 m²/gm and the following weight percent composition:

| | |
|---|---|
| CoO | 8.0 |
| NiO | 6.0 |
| Pd | 0.02 |
| Mullite | 85.98 |

EXAMPLE 5

"Catalyst 5" was evaluated as to its ability to effect a conversion of carbon monoxide, hydrocarbons and nitrogen oxides by determining the percent conversion of a mixture containing 1.0 percent carbon monoxide (CO), 1000 ppm nitric oxide (NO), 250 ppm (as carbon) hydrocarbons ($C_3H_6$), 0.5 percent and 2.0 percent oxygen ($O_2$), 10.0 percent water ($H_2O$), 10.0 percent $CO_2$ and the remainder being nitrogen ($N_2$). The gases were passed through the catalyst in a catalytic converter maintained at predetermined temperature (525°–1000°F.) at a gaseous hourly space velocity of 50,000. The results for "Catalyst 5" are shown in Table III below:

Table III

| | Catalytic Activity for "Catalyst 5" | | | |
|---|---|---|---|---|
| % $O_2$ | Ave. Catalyst Bed Temperature, °F. | Conversion (Mole %) | | |
| | | CO | HC | $NO_x$ |
| 2.0 | 803 | 99.0 | 94.9 | 4.8 |
| 2.0 | 1004 | 97.8 | 96.5 | — |
| 0.5 | 516 | 2.0 | 4.3 | 14.5 |
| 0.5 | 774 | 47.3 | 81.7 | 51.5 |

EXAMPLE 6

A mullite filled polyethylene composition containing the following components, 86 grams particle form linear polyethylene of 0 Melt Index (SLMI), 76.8 grams of a mullite composition (75 percent by weight raw kyanite, −325 mesh, $Al_2O_3 \cdot SiO_2$ and 25 percent by weight South Caroline kaolin commercially available from Huber Corporation) and 28.8 grams of a mineral oil with approximately 80 percent saturates (viscosity: ss at 100°F. = 547, refractive index = 1.4932 ± 0.0003, and specific gravity at 15°C. = 0.9036–0.9071) available commercially as Shellflex 411 was prepared by compounding the raw materials in a Brabender Plastograph at 340°F. This composition was then pressed to a 12 mil sheet in a hydraulic press with 20 tons force, then repressed in a mold to give a ribbed sheet with a 6 mil backweb, and about 25 mil wide with a taper, 30 mil high ribs spaced one-eighth inch apart. From the ribbed sheet, strips were cut, and these were rolled up tightly with the ribs in the direction of the axis of the roll, forming a honeycomblike cylinder. This was inserted into a tight fitting, glass tube, and heated to heat-seal the consecutive layers of the spiral roll of ribbed sheet at about 300°F.

The cylinder was then cooled and immersed in hexane for 30 minutes to extract substantially all the mineral oil, then dried and heated in a furnace in an oxidizing atmosphere first to about 500°F. (over a period of about 2 hours) when degradation began as evidenced by the black color of the structure. The temperature was slowly increased and about 2 hours later and at about 1300°F. the structure turned white, indicating that the burn off of the polyethylene was complete. The temperature was then slowly increased and about 2 hours later the temperature reached 2650°F. where it was held for about 2 hours to sinter the remaining ceramic powder and cooled slowly (about 4 hours).

This monolith was then allowed to pick up metal nitrates by dipping it into 9 ml. of an aqueous solution containing 3.68 grams cobalt nitrate, 2.76 grams nickel nitrate, and 0.0033 grams of palladium in the form of palladium tetramine dinitrate.

The monolith was then dried at 250°F. and calcined for 3 hours at 1400°F. The final monolithic catalytic structure had the following composition:

| | |
|---|---|
| CoO | 5.7 |
| NiO | 4.3 |
| Pd | .02 |
| Mullite Monolith | 89.08 |

This monolith was then tested as to its catalytic activity by passing a composition comprising 250 ppm $C_3H_6$, 100 ppm NO, 1.0 percent CO, 10.0 percent $H_2O$, 0.5 and 2.0 percent $O_2$ (as indicated), and the remainder $N_2$ through the monolith at a gaseous hourly space velocity of 17,900. The results are shown in Table IV.

TABLE IV

| Hrs. on Stream | % $O_2$ | Monolithic Catalyst Average Catalytic Bed Temp., (°F.) | Conversion (Mole %) | | |
|---|---|---|---|---|---|
| | | | CO | $C_3H_6$ | NO |
| 0.2 | 0.5 | 900 | 100 | 93.2 | 93.2 |
| 0.7 | 0.5 | 799 | 100 | 88.5 | 87.7 |
| 1.1 | 0.5 | 696 | 100 | 76.3 | 63.6 |
| 2.0 | 0.5 | 586 | 96.8 | 24.7 | 3.5 |
| 2.4 | 0.5 | 451 | 71.8 | 3.2 | 0 |
| 3.1 | 0.5 | 314 | 6.5 | 0 | 0 |
| 3.5 | 2.0 | 310 | 2.5 | 3.2 | 0 |
| 4.1 | 2.0 | 444 | 70.3 | 41.9 | 0 |
| 4.5 | 2.0 | 601 | 92.2 | 61.6 | 6.8 |
| 5.2 | 2.0 | 713 | 100 | 86.5 | 12.3 |
| 5.8 | 2.0 | 804 | 100 | 93.2 | 7.4 |
| 6.2 | 2.0 | 900 | 100 | 95.3 | 4.0 |
| 6.6 | 0.5 | 903 | 100 | 92.5 | 87.7 |

EXAMPLE 7

A mullite monolith was prepared as described in Example 6. The monolith was then dipped into a slurry prepared by admixing 250 grams of rare earth stabilized gamma alumina prepared by placing 100 grams of micron sized gamma alumina in a container and rotating same to permit uniform impregnation with a 7 percent rare earth chloride solution containing by weight about 55.3 percent $La_2O_3$, 20.0 percent $Ce_2O_3$, 17.3 percent $Nd_2O_3$, 6.02 percent $Pr_2O_3$, and 1.33 percent $Sm_2O_3$. Sufficient solution (90 mls) was added until the pores of the alumina particles were filled. The impregnated alumina was then removed from the container and allowed to dry at about 110°C. for 2 hours. The rare earth impregnated alumina was then heated at 1600°F. for 5 hours and allowed to cool to room temperature. The stabilized fine sized alumina was then mixed with water to obtain a 25 percent by weight solids slurry. The monolith was then dipped into the slurry, removed and shaken to remove excess slurry. The wet monolith was sprayed with an air hose to remove excess slurry within the structure. The coated monolith was then dried for one-half hour at 150°-200°F., 1 hour at about 300°F., and then calcined 4 hours at 1600°F. The final monolith then contained about 10 percent by weight coating, based on the total weight of the structure.

The monolith was then coated with CoO, NiO and Pd as in Example 6. The monolith was dried for 2 hours at 150°C. and calcined at 1400°F. for 3 hours. Results similar to those of Example 6 were obtained.

What is claimed is:

1. A composition useful as an internal combustion engine exhaust catalyst which comprises 4–20 weight percent cobalt oxide, 0.1–15 weight percent nickel oxide, 0.005–0.1 weight percent palladium and the remainder being support material such that the total weight percent equal 100.

2. The composition according to claim 1 wherein said catalyst is 4–12 weight percent cobalt oxide, 2–12 weight percent nickel oxide, 0.01–0.06 weight percent palladium and the remainder being support material such that the total weight percent equals 100.

3. The composition according to claim 1 wherein said support is magnesium aluminate spinel having a surface area of 20–200 $m^2/gm$.

4. The composition according to claim 1 wherein said support material is mullite having a surface area of 20–200 $m^2gm$.

5. An article of manufacture useful as an internal combustion engine exhaust catalyst comprising a ceramic monolithic structure impregnated with a catalytic component consisting essentially of 4–20 weight percent cobalt oxide, 0–15 weight percent nickel oxide, and 0.01 to 0.06 weight percent palladium, said weight percent being based on the weight of the monolithic structure.

6. The article according to claim 5 wherein said ceramic structure consists essentially of mullite.

7. The article according to claim 5 wherein said monolithic structure contains a coating of a composition of stabilized transitional alumina, said composition comprising a transitional alumina and 0.1–10 percent by weight of at least one rare earth metal oxide, said weight percent being based on the weight of the alumina, said coating being between said monolithic structure and the catalytic component.

* * * * *